(12) United States Patent
Tsukahara et al.

(10) Patent No.: US 6,845,065 B2  
(45) Date of Patent: Jan. 18, 2005

(54) MAGNETO-OPTICAL RECORDING MEDIUM PROCESSING APPARATUS

(75) Inventors: Wataru Tsukahara, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 686 days.

(21) Appl. No.: 09/956,066

(22) Filed: Sep. 19, 2001

(65) Prior Publication Data

US 2002/0186623 A1 Dec. 12, 2002

(30) Foreign Application Priority Data

Jun. 8, 2001 (JP) ........................................ 2001-173713

(51) Int. Cl.⁷ ................................................ G11B 7/00
(52) U.S. Cl. ............................... 369/30.17; 369/13.17; 369/53.26; 369/53.28
(58) Field of Search ........................... 369/30.16, 44.28, 369/53.26, 116, 44.34, 13.17, 13.02, 13.22, 44.29, 44.36, 13.11, 53.3, 44.11, 53.28, 13.26, 30.17, 30.15, 44.18

(56) References Cited

U.S. PATENT DOCUMENTS 5,974,007 A * 10/1999 Getreuer .................. 369/30.16
6,434,087 B1 * 8/2002 Schell et al. ............. 369/13.02
6,741,529 B1 * 5/2004 Getreuer .................. 369/30.17

FOREIGN PATENT DOCUMENTS

| JP | 62-189655 | 8/1987 |
| JP | 63-144445 | 6/1988 |
| JP | 09-073676 | 3/1997 |
| JP | 2000-189655 | 7/2000 |
| JP | 2000-339695 | 12/2000 |

* cited by examiner

Primary Examiner—Ali Neyzari  
(74) Attorney, Agent, or Firm—Greer, Burns & Crain, Ltd.

(57) ABSTRACT

A magneto-optical recording medium processing apparatus of the present invention limits, via a predetermined current limiting means, the bias current applied to a bias coil during seek, when a seek current is applied to a carriage. In accordance therewith, it is possible to reduce the peak of the sum current, which is the total of the seek current and the bias current, and the current consumption of the entire apparatus can also be curbed. Current limiting means, for example, sets a bias current that is smaller than the specified value of the bias current required at media access time, and sets a bias current value such that the total of the seek current and bias current does not exceed an allowable current.

9 Claims, 13 Drawing Sheets

MAGNETO-OPTICAL RECORDING MEDIUM PROCESSING APPARATUS

BACKGROUND OF THE INVENTION

1. Field of the Invention

The present invention is related to a magneto-optical recording medium processing apparatus for controlling recording and reproduction in relation to a magneto-optical recording medium, and more particularly to a magneto-optical recording medium processing apparatus for suppressing current consumption.

2. Description of the Related Art

In a magneto-optical recording medium processing apparatus, it is necessary to apply a bias magnetic field to the magneto-optical recording medium when recording to the magneto-optical recording medium, at deletion, and even at reproduction for a so-called MSR medium (a magneto-optical recording medium that utilizes magnetically-induced super resolution), which has been made practicable in recent years. A coil is used as means for generating a bias magnetic field, but when applying a bias current to a coil, slow current rise due to the affects of coil inductance must be taken into consideration.

For example, when seek is performed for moving a carriage, which guides a laser beam to a medium surface, transversely (radially) across the tracks of the medium, and positioning it at a targeted location over the surface of the medium, because current rise is slow even when a bias current begins to flow through the coil following seek, it takes a predetermined time until a bias magnetic field of the prescribed size is generated, and there are assumed to be cases in which recording, deletion, and reproduction timing (hereinafter, there are cases when these will be referred to as access timing) will be not fast enough.

Figure 12:
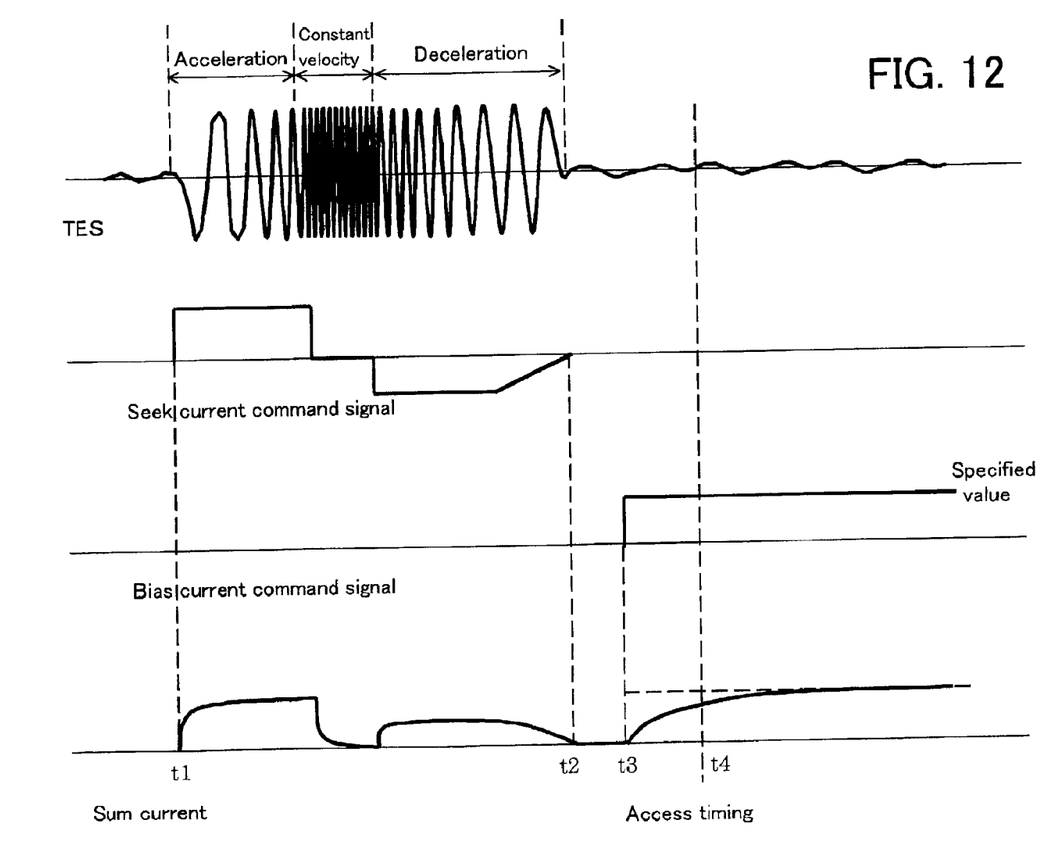
FIG. 12 is a diagram illustrating a case in which a bias current is applied subsequent to seek.

FIG. 12 is a diagram illustrating a case in which a bias current is applied subsequent to seek. As shown in FIG. 12, during seek (timing t1–t2), a signal (seek current command signal) for controlling the movement of the carriage (seek) is outputted on the basis of a tracking error signal (TES), and a seek current corresponding thereto is generated. Then, subsequent to seek (timing t3), a bias current command signal for generating a bias magnetic field of a specified value is outputted, and a bias current is generated in accordance therewith. However, since bias current rise is slow in the case of FIG. 12, the bias current does not attain the specified value at access timing (timing t4), the application of a prescribed-value bias magnetic field is not fast enough, and recording, deletion and reproduction are not performed normally.

In a case like this, for example, seek is performed once again one track inwardly while the bias current is being applied as-is, and recovery processing, which repositions the carriage at a targeted location in accordance with the subsequent rotation of the medium, is executed, but wasted time and current are consumed.

To solve for this kind of malfunction, a method for applying a bias current either before starting seek or during seek is known.

Figure 13:
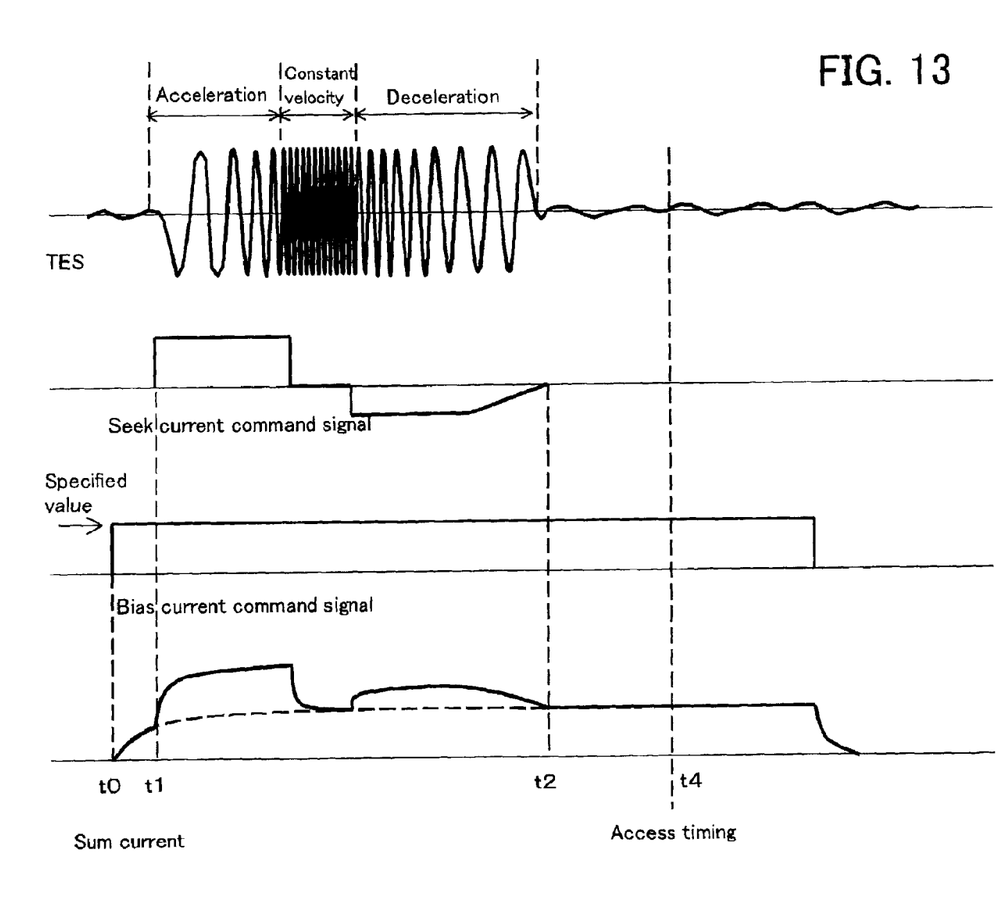
FIG. 13 is a diagram illustrating a case in which a bias current is applied before seek.

FIG. 13 is a diagram illustrating a case in which a bias current is applied before seek. As shown in FIG. 13, a bias current command signal for generating a bias magnetic field of a specified value is outputted before (timing t0) the start of seek (timing t1), and in accordance therewith, a bias current is applied beforehand. Consequently, the bias current attains the specified value during seek. And then, in a state, wherein a bias current is applied as-is, a seek current command signal based on a tracking error signal (TES) is outputted, and a seek current corresponding thereto is generated. Then, in this case, since the bias current has already attained the specified value at post-seek (timing t2) access timing (timing t4), deletion, recording, and reproduction can be started immediately subsequent to seek.

However, in this case, because the seek current and bias current are applied simultaneously, the peak value of current consumption, which is the total of the seek current and bias current, increases. In line with the improved seek performance of recent years, seek current has also increased, and because of the need for even larger magnetic fields in line with increasing the density of recording media, the bias current is also showing a tendency to increase in accordance with demand for battery-powered drive and a power source for an apparatus connected via an interface. Further, in the case of a medium that requires a reproduction magnetic field, there are times when a large bias magnetic field is needed due to the characteristics of the magnetic film, and, according to circumstances, there are times that require a field larger than the recording and deletion fields. Under conditions such as these, current consumption must be reduced.

SUMMARY OF THE INVENTION

Accordingly, an object of the present invention is to provide a magneto-optical recording medium processing apparatus capable of suppressing current consumption without causing a drop in medium access performance.

To achieve the above-mentioned object, a magneto-optical recording medium processing apparatus of the present invention limits, via a predetermined current limiting means, the bias current applied to a bias coil during seek, when a seek current is applied to a carriage. In accordance therewith, it is possible to reduce the peak of the sum current, which is the total of the seek current and the bias current, and the current consumption of the entire apparatus can also be curbed.

Current limiting means, for example, sets a bias current that is smaller than the specified value of the bias current required at media access time, and sets a bias current value such that the total of the seek current and bias current does not exceed an allowable current.

DESCRIPTION OF THE PREFERRED EMBODIMENTS

Aspects of the embodiment of the present invention will be explained hereinbelow. However, the technical scope of the present invention is not limited to these aspects of the embodiment.

Figure 1:
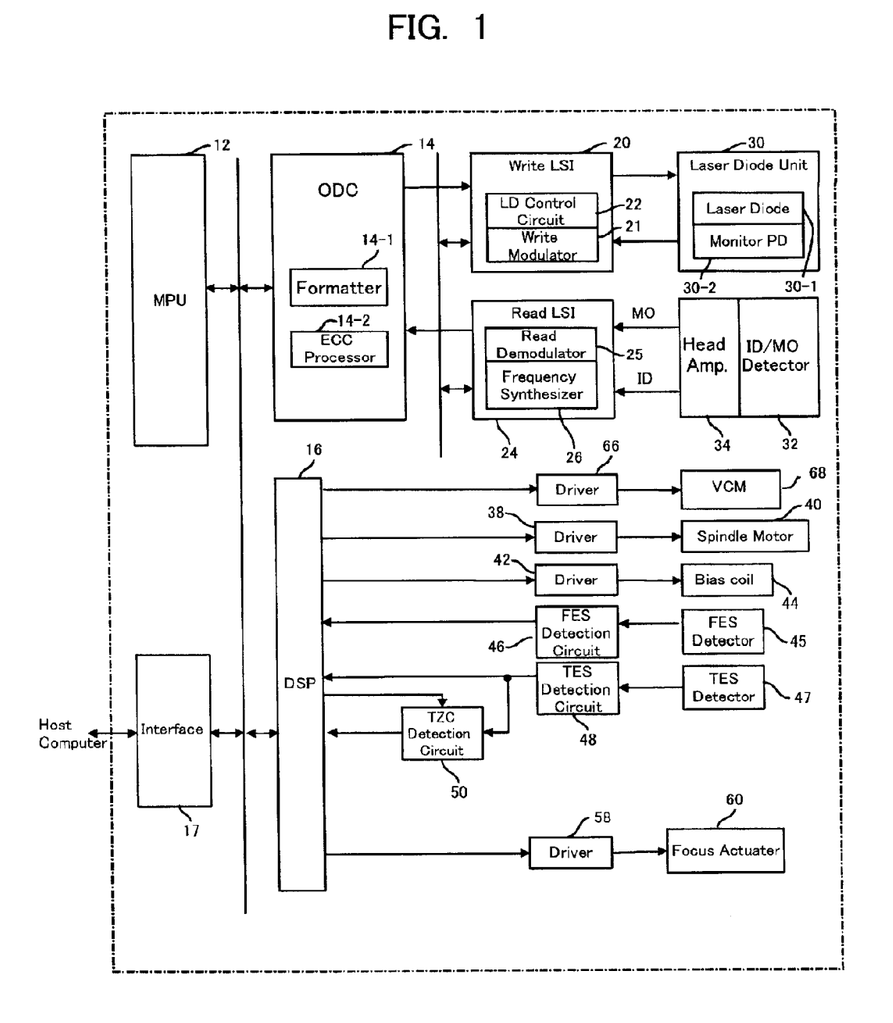
FIG. 1 is a diagram showing an example of a block configuration of a magneto-optical recording medium processing apparatus of an aspect of the embodiment of the present invention.

FIG. 1 is a diagram showing an example of a block configuration of a magneto-optical recording medium processing apparatus of an aspect of the embodiment of the present invention. In FIG. 1, the magneto-optical recording medium processing apparatus is connected to a host system via an interface 17. The magneto-optical recording medium processing apparatus has an MPU (micro processing unit) 12 for performing overall control, an optical disk controller (ODC) 14 for performing the processing required for commands and data read/write between the apparatus and a medium, and a digital signal processor (DSP) 16.

ODC 14 has a formatter 14-1, and an error correction code (ECC) processor 14-2. At write access, formatter 14-1 generates a recording format by dividing write data into magneto-optical recording medium sector units, and the ECC processor 14-2 generates and adds ECC in sector write data units, and, in addition, generates and adds a cyclic redundancy check (CRC) as needed.

At read access, error detection and error correction are performed after ECC processor 14-2 conducts a CRC for sector data that has been read. Furthermore, formatter 14-1 links sector data, and sends it to the host system as read data.

A write LSI 20 has a write modulator 21 and a laser diode control circuit 22. Control output of the laser diode (LD) control circuit 22 is supplied to a laser diode unit 30 provided in the optical head, and a laser beam is irradiated onto the surface of a magneto-optical recording medium. Laser diode unit 30 has a laser diode 30-1 and a monitor detector 30-2 in an integrated condition. Write modulator 21, in accordance with the type of magneto-optical disk, converts write data to a data format for either pit position modulation (PPM) recording (also called mark recording) or pulse width modulation (PWM) recording (also called edge recording).

A read LSI 24 has a read demodulator 25 and a frequency synthesizer (PLL (phase-locked loop) circuit) 26. A received-light signal of laser beam return light from laser diode 30-1 is inputted as an ID signal and an MO signal to read LSI 24 via head amp 34 by an ID/MO detector 32 provided in the optical head. Then, frequency synthesizer 26 generates a read clock that is synchronized to a sector VFO (variable frequency oscillator) signal. Further, read demodulator 25 detects a sector mark from either an ID signal or a MO signal from the optical head, and outputs the detected signal SM to ODC 14. Further, read demodulator 25 outputs a MO signal inputted from the optical head to ODC 14 as digital-converted sector data.

DSP 16 comprises a servo function for positioning a laser beam in relation to a magneto-optical recording medium, and functions as a seek controller and an on-track controller for seeking a targeted track and keeping a laser beam on track.

A tracking error signal (TES) detector 47 for intercepting return light from a magneto-optical recording medium is provided in the optical head. A TES detection circuit 48 generates a TES from received-light output of TES detector 47, and inputs same to DSP 16. TES is also inputted to a track zero cross (TZC) detection circuit 50, a TZC pulse is generated, and inputted to DSP 16. And then, DSP 16 drives a driver 66, controls a voice coil motor (VCM) 68, and executes seek control and on-track control, which moves the optical head-equipped carriage in a direction that traverses a track.

Further, a focus error signal (FES) detector 45 for intercepting return light from a magneto-optical recording medium is provided in the optical head. An FES detection circuit 46 generates an FES from received-light output from FES detector 45, and inputs same to DSP 16. And then, DSP 16 drives a driver 58, controls a focus actuator 60, and executes focus entry control.

Furthermore, DSP 16 controls a spindle motor 40 via a driver 38 in accordance with MPU 12 commands, controls a current supplied to bias coil 44 via driver 42, and controls a magnetic field generated by bias coil 44. Bias coil 44 is arranged on the opposite side from the optical head side of the magneto-optical recording medium surface, and applies a bias magnetic field to a magneto-optical recording medium for recording and deletion. Further, when a magneto-optical recording medium is a MSR medium, a bias magnetic field is applied at reproduction, too.

Figure 2:
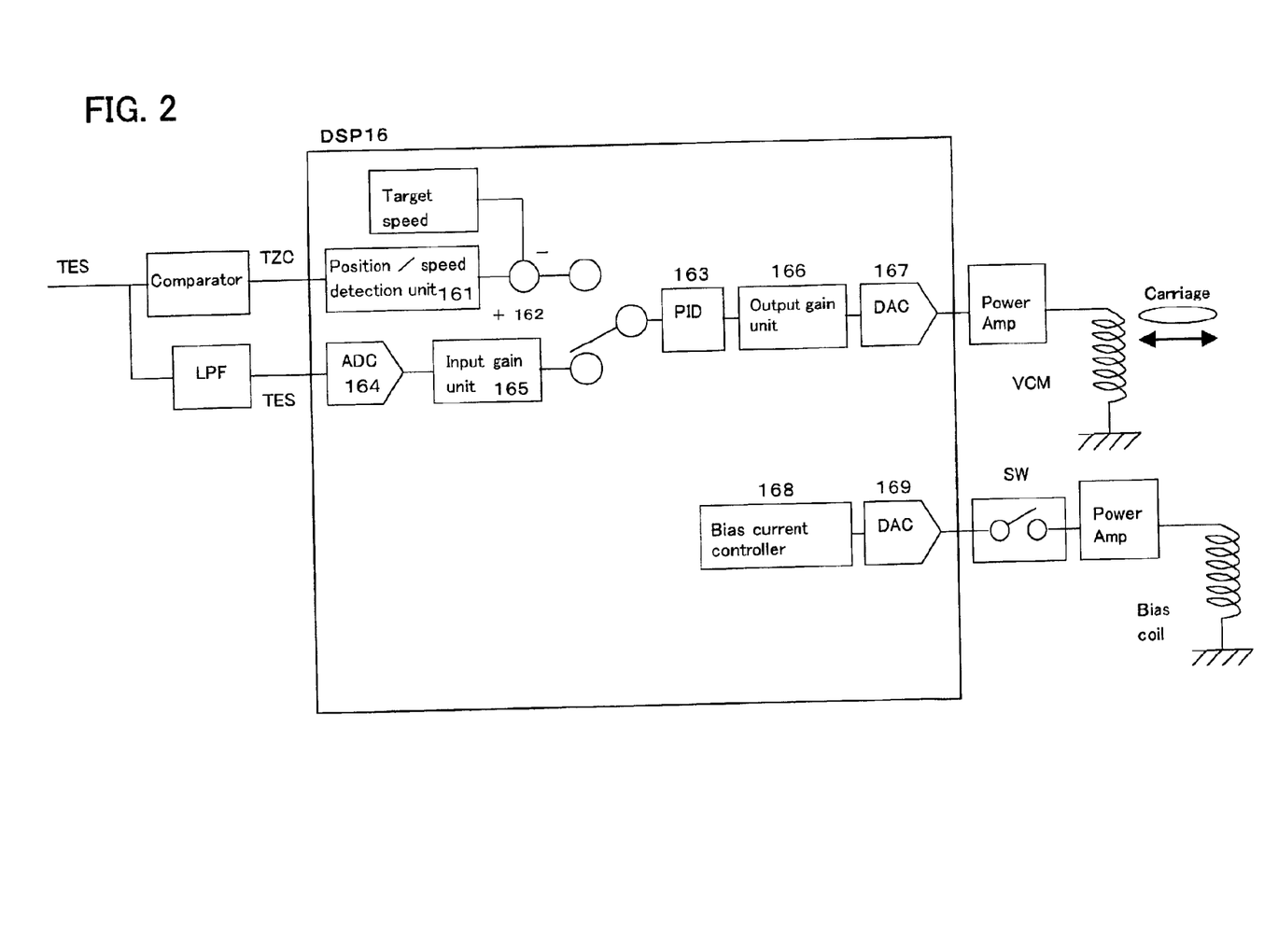
FIG. 2 is a simplified block diagram of DSP16.

FIG. 2 is a simplified block diagram of DSP 16. In FIG. 2, a tracking error signal (TES) is one, which indicates, with a sine wave-shaped signal, a divergence from track center on a medium, and is generated in the optical head. This signal is divided into two, the one side passes through a comparator and is inputted to DSP 16 as a TZC signal, and the other side passes through a LPF (low-pass filter) and is inputted to DSP 16 as a TES signal.

A TZC signal is an edge signal, which binarize a tracking error signal, and a position/speed detection unit 161 of DSP 16 can detect current position during seek by counting the edges of this TZC signal, and can detect the actual seek rate (media track pitch information is also needed) by measuring period time between edges.

A subtraction unit 162 of DSP 16 determines a target speed from a current position, and calculates the difference between this target speed and a detected actual speed. The calculated speed error is inputted to a PID (proportional-integral-differential) filter 163. Meanwhile, TES signals, which have passed through an LPF, are converted to digital signals by an ADC (analog-to-digital converter) 164 at each sampling frequency, and the input gain is multiplied by an input gain unit 165. Furthermore, this input gain is for absorbing irregularities in input sensitivity (circuit constants, signal sensitivity). The result of this constitutes a positional error, and is inputted to PID filter 163.

PID filter 163 is for reduction compensation/phase lead computation, and a switch is connected to the TES side when a track servo loop is closed, and to the TZC side at seek control. Furthermore, this switch is left open as-is, and input constitutes a zero state when seek (carriage control) is not being performed, and the track servo loop is not closed.

As for the results of PID filter 163 computations, output gain is multiplied by an output gain unit 166, and outputted via a DAC (digital-to-analog converter) 167 as a control command signal. This output gain is for absorbing irregularities in output sensitivity (drive sensitivity of driver, actuator acceleration performance). A seek current is applied to a VCM (voice coil motor) via a power amp by an outputted seek current command signal.

A bias current controller 168 executes bias current control characteristic of an aspect of the embodiment of the present invention, and a bias current command signal set by bias current controller 168 is outputted via a DAC (digital-to-analog converter) 169. A current is applied to a bias coil via the power amp by a bias current command signal from DAC 169. Furthermore, required specified values corresponding respectively to deletion, recording, and reproduction in relation to a medium are set in bias current controller 168 by MPU 12 as bias current command signals.

FIGS. 3A, 3B, 3C and 3D are diagrams illustrating bias current control in a first aspect of the embodiment of the present invention, and waveform diagrams of a TES signal (FIG. 3A), a seek current command signal (FIG. 3B), a bias current command signal (FIG. 3C), and a sum current (FIG. 3D) are shown. In the first aspect of the embodiment, peak current consumption during seek can be curbed by outputting a bias current control signal such that a bias current lower than a specified value is applied during seek, and, in addition, a bias current of a specified value can be applied at an access timing subsequent to seek by applying a certain bias current.

In FIGS. 3A, 3B, 3C and 3D, a specified value bias current command signal for generating a bias magnetic field of the required size is outputted before (timing t0) the start of seek (timing t1), and in accordance therewith, a bias current is applied beforehand. Then, when a seek current command signal for seek is outputted at timing t1, the bias current command signal is set at a value lower than the specified value. As a result of this, the bias current during seek is reduced, and the sum current also decreases by this amount. In particular, the peak current at seek acceleration is curbed. Furthermore, the size of the bias current during seek is indicated by the dotted line in FIG. 3D. Further, in FIGS. 3A, 3B, 3C and 3D, an example is given of when the bias current command signal is reduced to 50% of the specified value.

Thus, during seek, it is possible to suppress the sum current, which is the total of a seek current and a bias current, by making the bias current command signal smaller than a specified value. Then, the bias current command signal returns to the specified value subsequent to the completion of seek (timing t2). Subsequent to seek completion (timing t2), the bias current can attain the specified value by access timing (timing t4) because the time required for ID read and so forth is generated for checking the current position. The current value for generating a targeted size of bias magnetic field is made the specified value.

Figure 4:
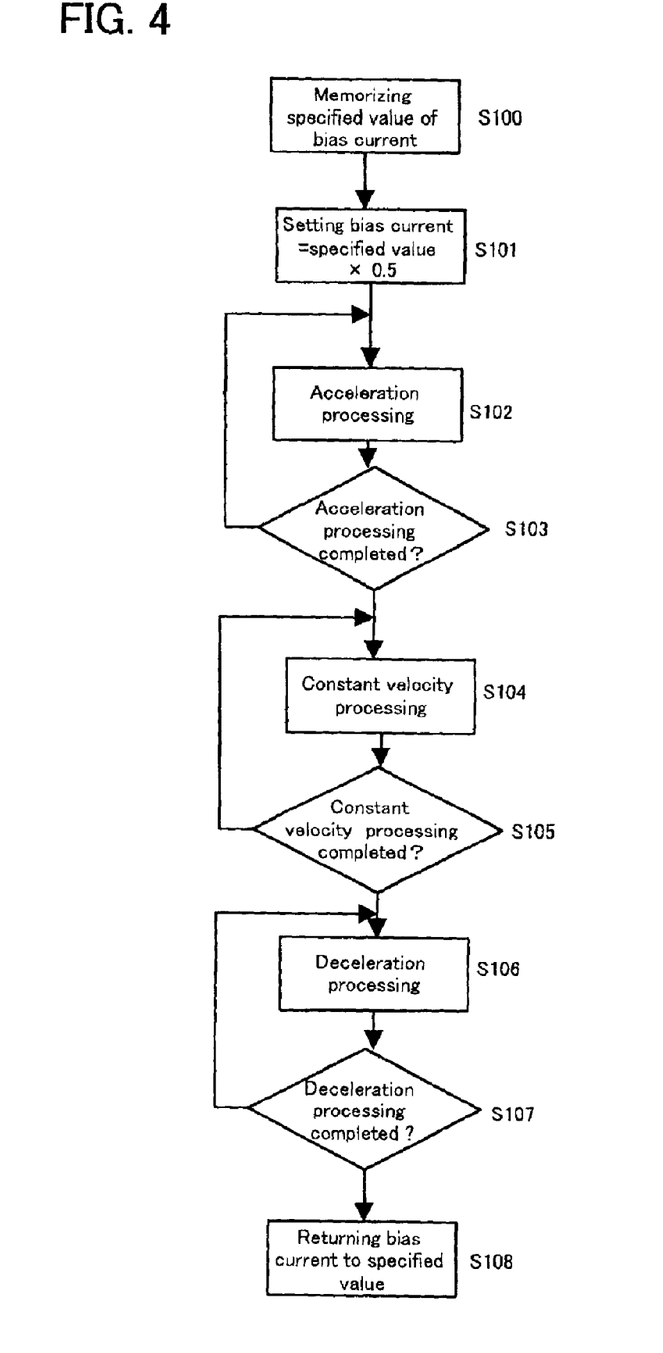
FIG. 4 is a flowchart of bias current control in the first aspect of the embodiment.
Figure 5:
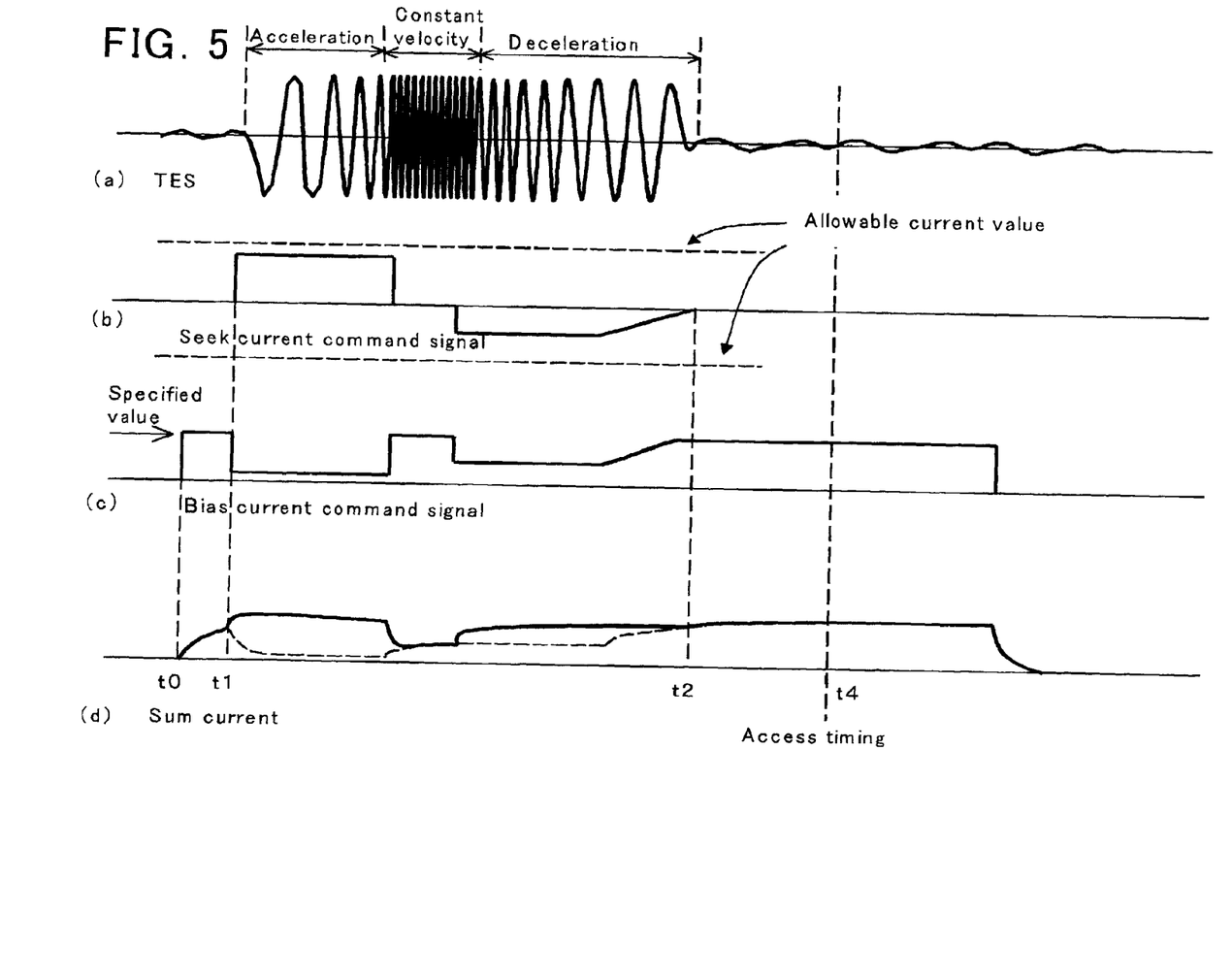
FIGS. 5A, 5B, 5C and 5D are diagrams illustrating bias current control in a second aspect of the embodiment of the present invention.

FIG. 4 is a flowchart of bias current control in the first aspect of the embodiment. In FIG. 4, when the bias current controller 168 of DSP 16 receives a seek command from the MPU, it stores a specified value of a bias current command signal in backup memory during output (S100). The backed-up specified value is a specified value of processing, which is executed subsequent to a seek command for specified values set for recording, reproduction and deletion, respectively. Bias current controller 168 sets bias current command signals that are smaller than these specified values (S101). More specifically, a bias current value that is smaller than a specified value is determined by multiplying a predetermined constant (less than 1, for example 0.5) by the specified value, and bias current controller 168 outputs to the bias coil a bias current command signal corresponding to this bias current value that is smaller than the specified value. Thereafter, seek control is started.

Figure 3:
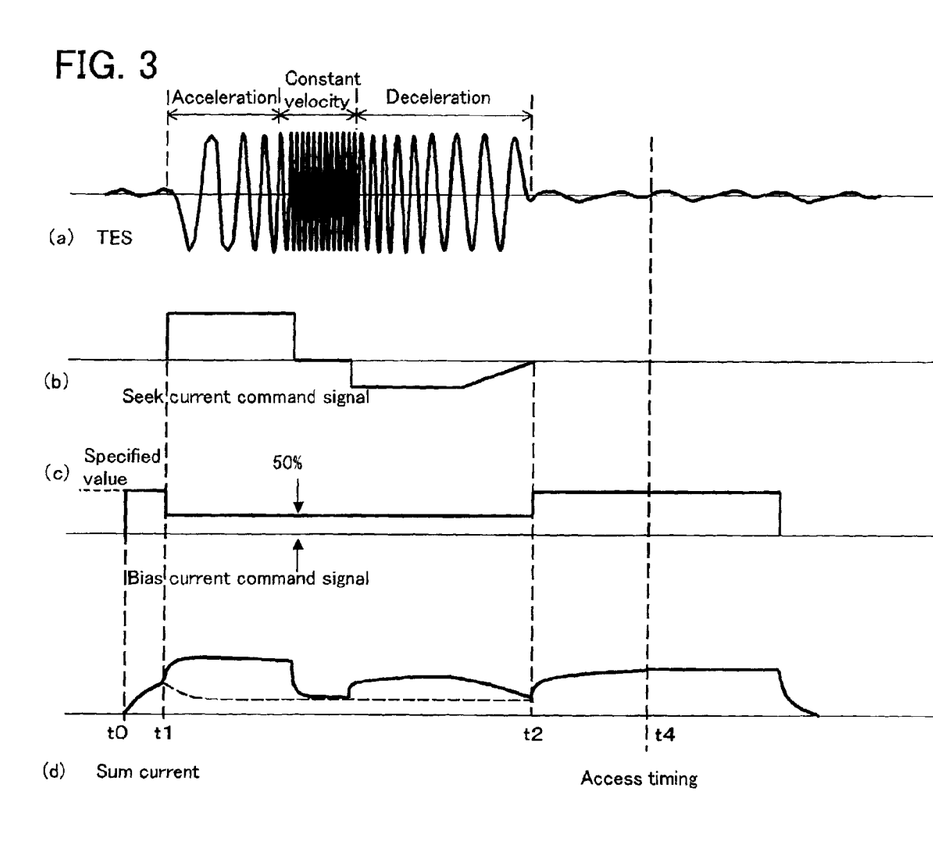
FIGS. 3A, 3B, 3C and 3D are diagrams illustrating bias current control in a first aspect of the embodiment of the present invention.

That is, first, the carriage is subjected to acceleration processing (S102), and when acceleration processing is completed (S103), constant velocity processing is performed (S104), and when constant velocity processing is completed (S105), deceleration processing is performed (S106), and when deceleration processing is completed (S107), seek ends. Since a bias current value that is smaller than a specified value is outputted during seek, as shown in FIG. 3D, the peak of the sum current, which is the total of the seek current and the bias current, is held down. When seek is completed, bias current controller 168 reads out the backed-up specified value of the bias current, and returns the bias current command signal to the specified value (S108). In accordance therewith, the bias current can be restored to the specified value by access timing (t4).

Furthermore, the present invention is not limited to a case in which a bias current value that is smaller than a specified value is determined by multiplying the constant for one terminal by the specified value, and, for example, can also be determined by subtracting a predetermined value.

FIGS. 5A, 5B, 5C and 5D are diagrams illustrating bias current control in a second aspect of the embodiment of the present invention, and similar to FIGS. 3A, 3B, 3C and 3D, waveform diagrams of a TES signal (FIG. 5A), a seek current command signal (FIG. 5B), a bias current command signal (FIG. 5C) and a sum current (FIG. 5D) are shown. In the second aspect of the embodiment, current consumption during seek is suppressed by setting a bias current value such that it does not exceed a predetermined allowable current value during seek.

In FIGS. 5A, 5B, 5C and 5D, a bias current command value of a specified value is outputted before (timing t0) the start of seek (timing t1), and in accordance therewith, a bias current is applied beforehand. Then, when a seek current command signal is outputted for seek at timing t1, a value which subtracts the seek current value from the allowable current value is set as the bias current value.

As a result of this, when the sum total of a seek current and a bias current exceed the allowable current, the bias current is set at a value that is less than the specified value. An example of the size of a bias current during seek is indicated by the dotted line of FIG. 5D.

Thus, since a bias current value is set so as not to exceed an allowable current value during seek, the bias current during seek is held down. And subsequent to seek completion (timing t2), the bias current command signal returns to the specified value, and the bias current attains the specified value by access timing.

Figure 6:
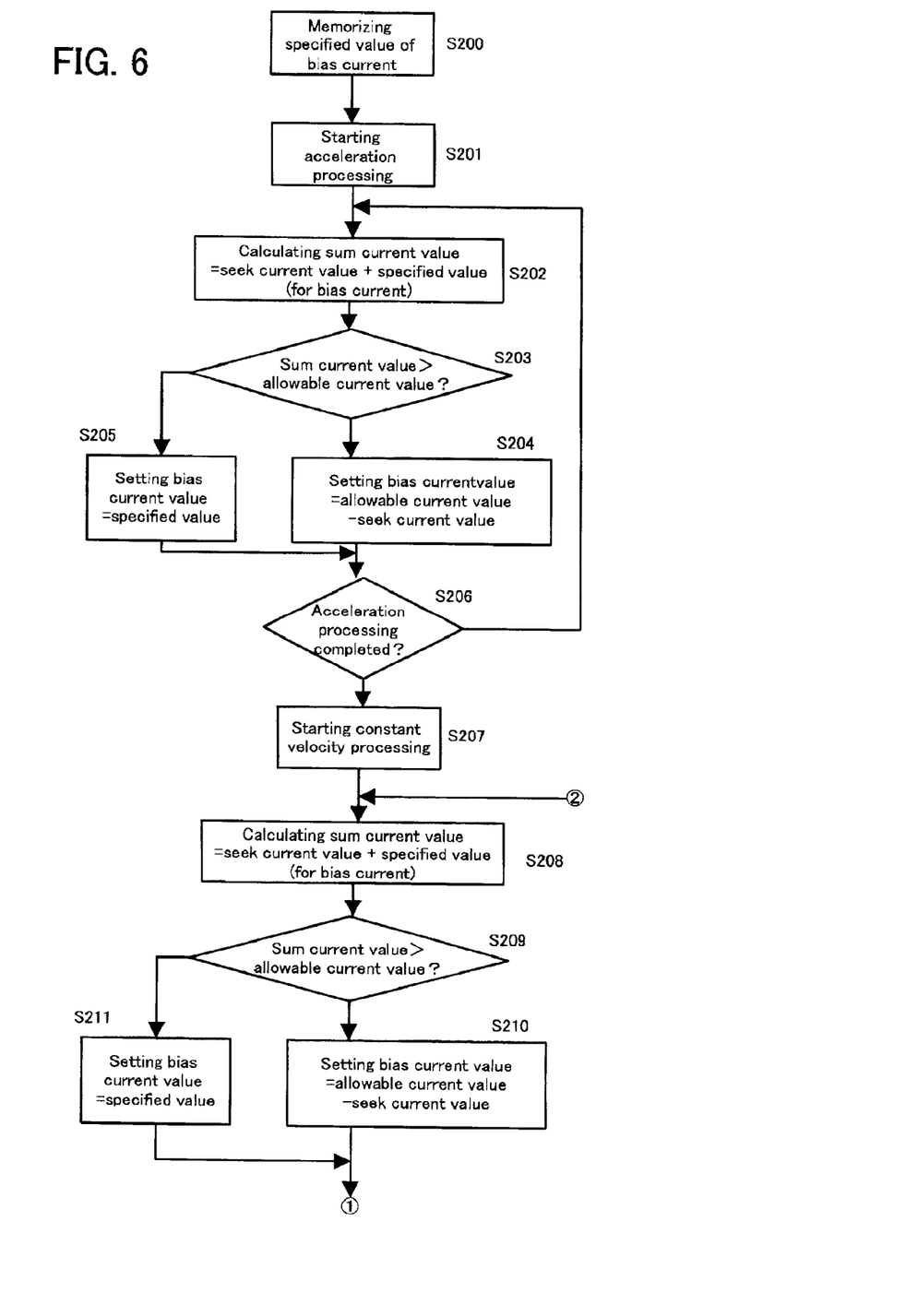
FIG. 6 is a flowchart of bias current control in the second aspect of the embodiment.
Figure 7:
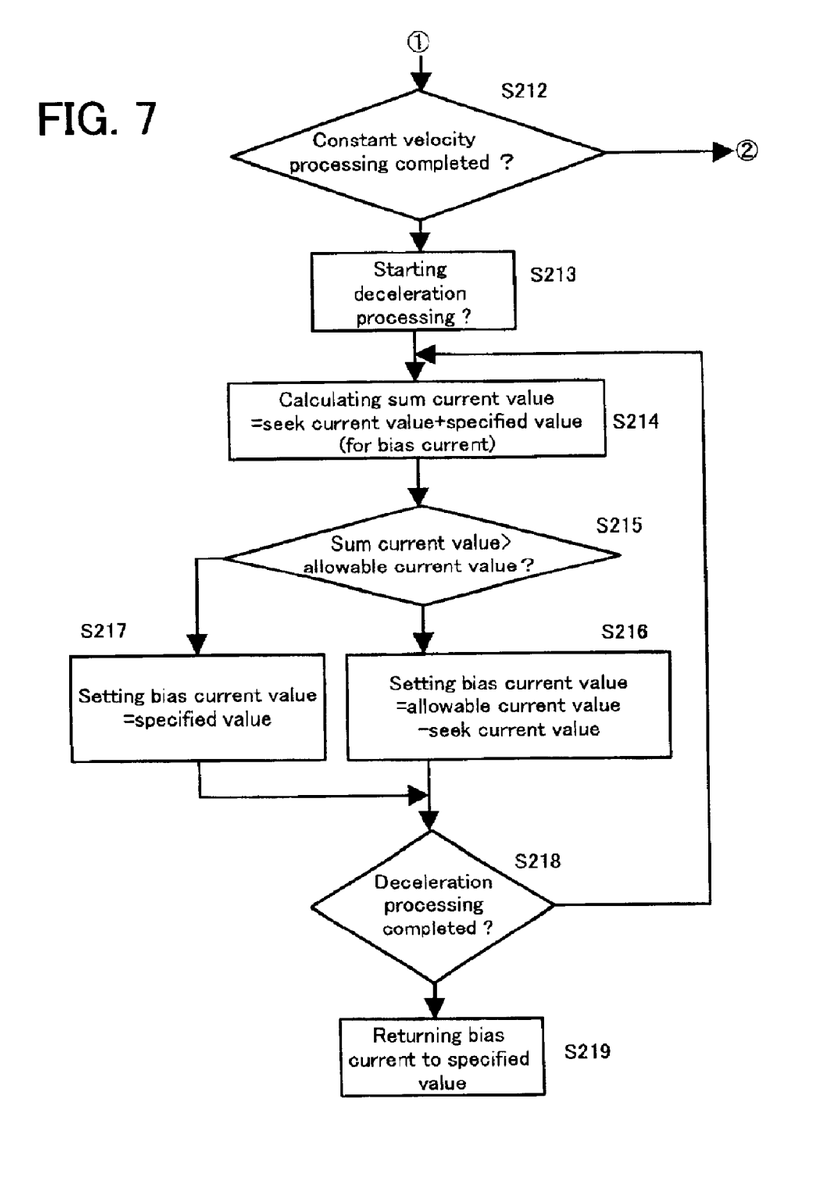
FIG. 7 is a flowchart of bias current control in the second aspect of the embodiment.
Figure 8:
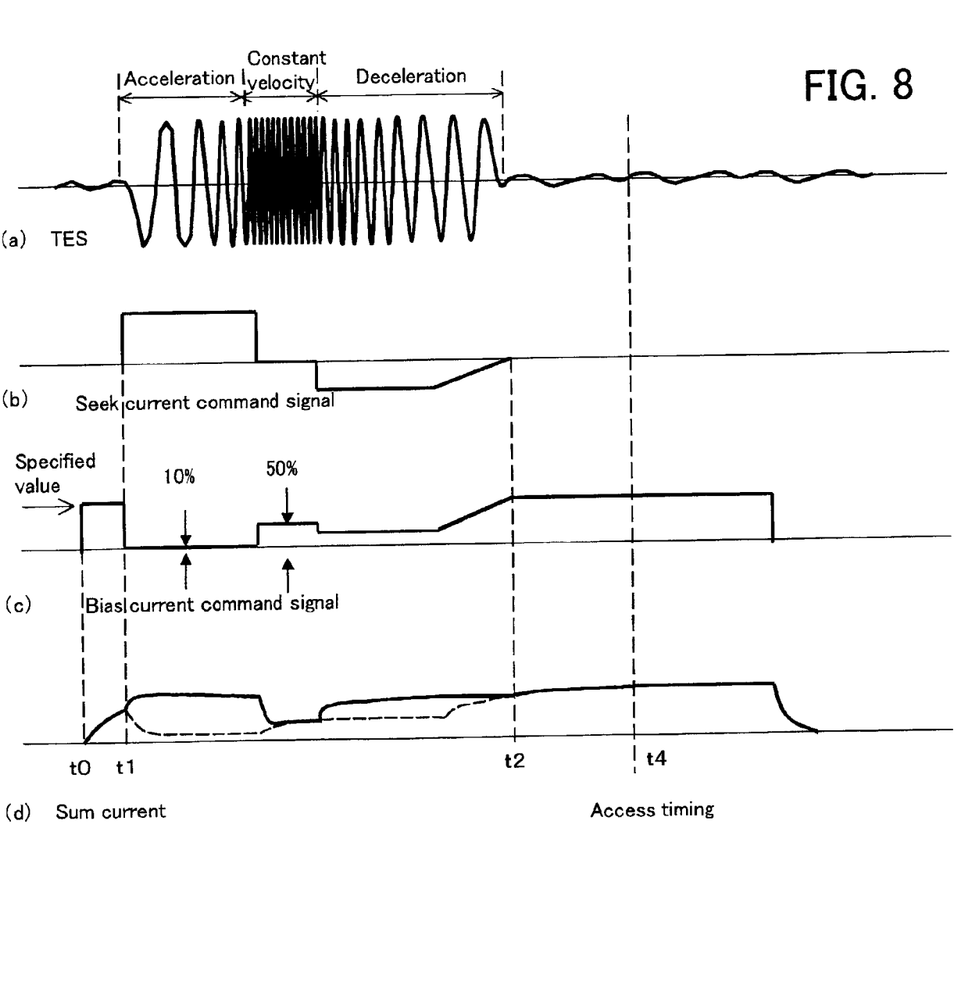
FIGS. 8A, 8B, 8C and 8D are diagrams illustrating bias current control in a third aspect of the embodiment of the present invention.

FIG. 6 and FIG. 7 are flowcharts of bias current control in the second aspect of the embodiment. In FIG. 6, when the DSP 16 bias current controller 168 receives a seek command from the MPU, it stores the specified value of the bias current command signal in backup memory (S200). The backed-up specified value is a specified value of processing, which is executed subsequent to a seek command for specified values set for recording, reproduction and deletion, respectively. When acceleration processing is started in seek control (S201), bias current controller 168 performs the calculation (S202)

Seek current value+specified bias current value=sum current value and compares the sum current value thereof against the allowable current value (S203).

When the sum current value>the allowable current value, bias current controller 168 also performs the calculation Allowable current value−seek current value=bias current value and sets the bias current value calculated therein (S204).

Conversely, when the sum current value≦the allowable current value, bias current controller 168 sets the backed-up specified value as the bias current value (S205). And then, bias current controller 168 outputs the respective set bias current values as bias current command signals.

The same processing is also performed for constant velocity processing and deceleration processing in seek control (S206–S218). That is, a sum current is compared against an allowable current, and when the sum current value>the allowable current value, the value resulting from allowable current value−seek current value is set as the bias current value, and when the sum current value≦the allowable current value, a backed-up specified value is set as the bias current value. When seek is completed, bias current controller 168 reads out the backed-up specified value of the bias current, and returns the bias current command signal to the specified value (S219). In accordance therewith, the bias current attains the specified value by access timing (timing t4).

FIGS. 8A, 8B, 8C and 8D are diagrams illustrating bias current control in a third aspect of the embodiment of the present invention, and similar to FIGS. 3A, 3B, 3C and 3D, waveform diagrams of a TES signal (FIG. 8A), a seek current command signal (FIG. 8B), a bias current command signal (FIG. 8C) and a sum current (FIG. 8D) are shown. In the third aspect of the embodiment, the bias current control of the above-mentioned first and second aspects of the embodiment are converted and used in acceleration processing, constant velocity processing and deceleration processing during seek.

As shown in FIGS. 8A, 8B, 8C and 8D, the first aspect of the embodiment is used in acceleration processing and constant velocity processing, and a value achieved by multiplying a predetermined constant by the specified value of a bias current is set as the bias current value. The constant, which is multiplied by the specified value at this time can differ for the respective processing. When a relatively large seek current is required, as in acceleration processing, a small constant (in FIGS. 8, 0.1) is set to lower the bias current, and in constant velocity processing, in which the seek current is relatively small, a constant larger than the constant set for acceleration processing (in FIGS. 8, 0.5) can be set.

Furthermore, in deceleration processing, for example, the second aspect of the embodiment is used, the value resulting from allowable current value−seek current value is set as the bias current value, and the peak value of the sum current is held down. Subsequent to seek completion, the bias current value returns to the specified value.

Figure 9:
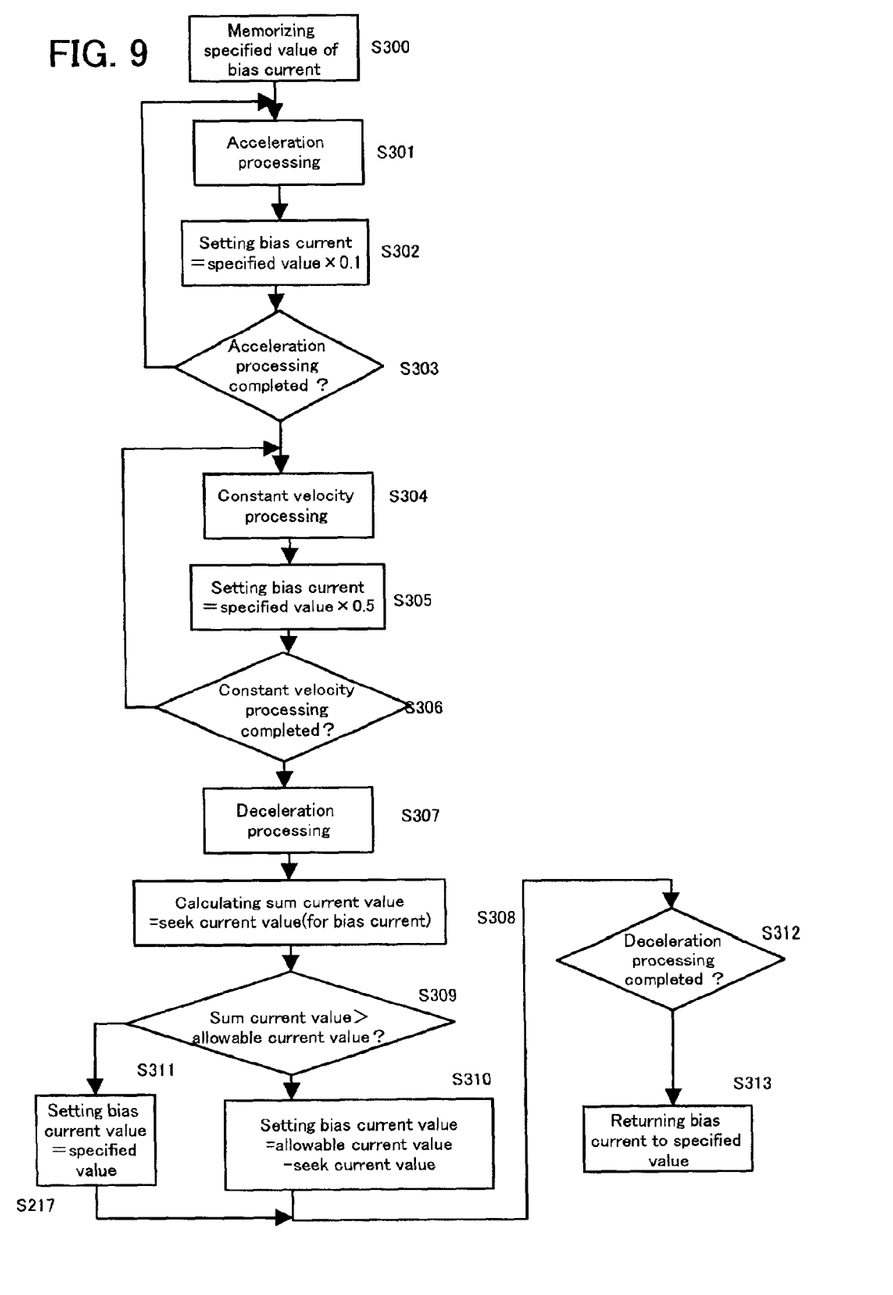
FIG. 9 is a flowchart of bias current control in the third aspect of the embodiment.
Figure 10:
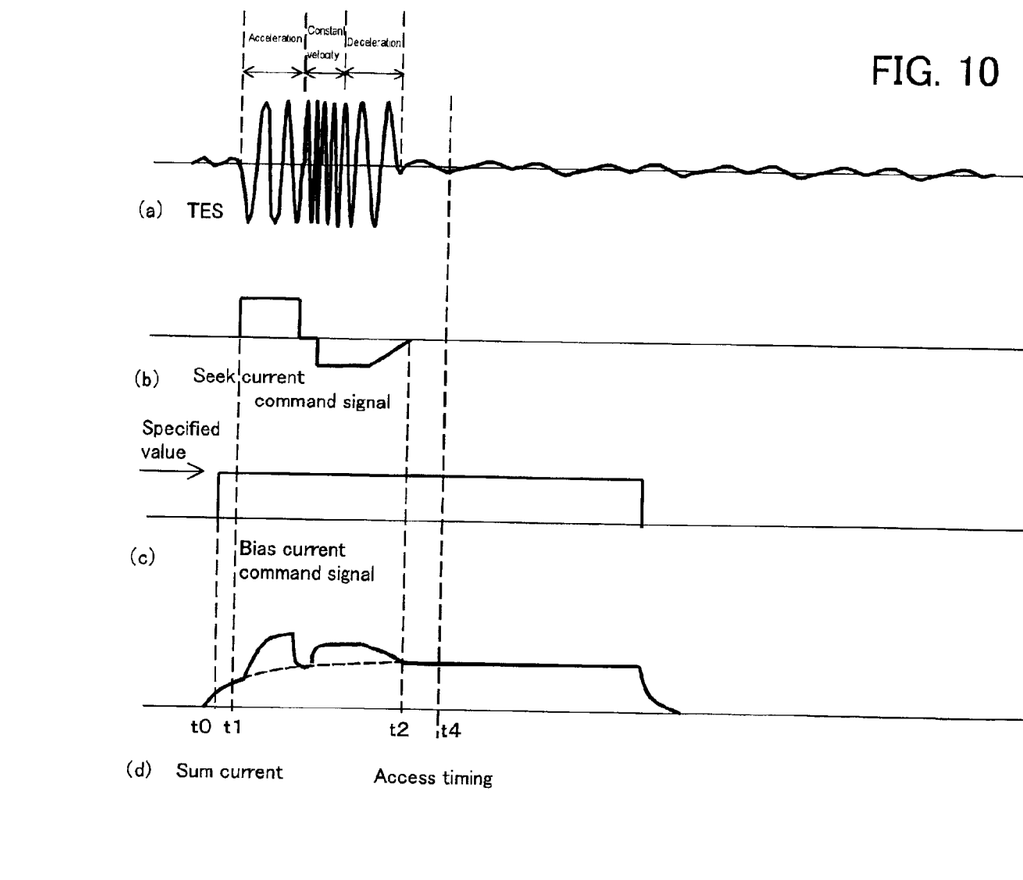
FIGS. 10A, 10B, 10C and 10D are diagrams illustrating bias current control in a fourth aspect of the embodiment of the present invention.

FIG. 9 is a flowchart of bias current control in the third aspect of the embodiment. In FIG. 9, when the DSP 16 bias current controller 168 receives a seek command, it stores the specified value of the bias current command signal in backup memory (S300).

When acceleration processing is started in seek control (S301), bias current controller 168 multiplies a predetermined constant (less than 1, 0.1 for example) by a specified value, and sets a bias current value that is smaller than the specified value (S302).

When acceleration processing ends (S303), and seek control becomes constant velocity processing (S304), bias current controller 168 resets the bias current value. That is, bias current controller 168 multiplies another constant, which differs from the constant in acceleration processing, by the specified value of the bias current, and sets a new bias current value (S305).

When acceleration processing ends (S306), and seek control moves to deceleration processing (S307), bias current controller 168 performs the calculation (S308)

Seek current value+specified bias current value=sum current value and compares this sum current value against the allowable current value (S309).

When the sum current value>the allowable current value, bias current controller 168 also performs the calculation Allowable current value−seek current value=bias current value and sets this calculated value as the bias current value (S310).

Conversely, when the sum current value≦the allowable current value, bias current controller 168 sets the backed-up specified value as the bias current value (S311). And then, bias current controller 168 outputs the respective set bias current values as bias current command signals.

When deceleration processing is complete (seek completion) (S312), bias current controller 168 reads out the backed-up specified value of the bias current, and returns the bias current command signal to the specified value (S313).

FIGS. 10A, 10B, 10C and 10D are diagrams illustrating bias current control in a fourth aspect of the embodiment of the present invention, and similar to FIGS. 3A, 3B, 3C and 3D, waveform diagrams of a TES signal (FIG. 10A), a seek current command signal (FIG. 10B), a bias current command signal (FIG. 10C) and a sum current (FIG. 10D) are shown. When the time from the start of seek to access (that is, seek time and the ID read time for checking the current position subsequent to seek) is shorter than bias current rise time, even if bias current control such as that explained in the above respective aspects of the embodiment is performed, there are cases in which it will not be fast enough. Accordingly, in the fourth aspect of the embodiment, when seek time is determined, and seek time is shorter than a predetermined time, a bias current value of a specified value is outputted as-is even during seek without executing bias current control such as that explained in the above respective aspects of the embodiment.

Figure 11:
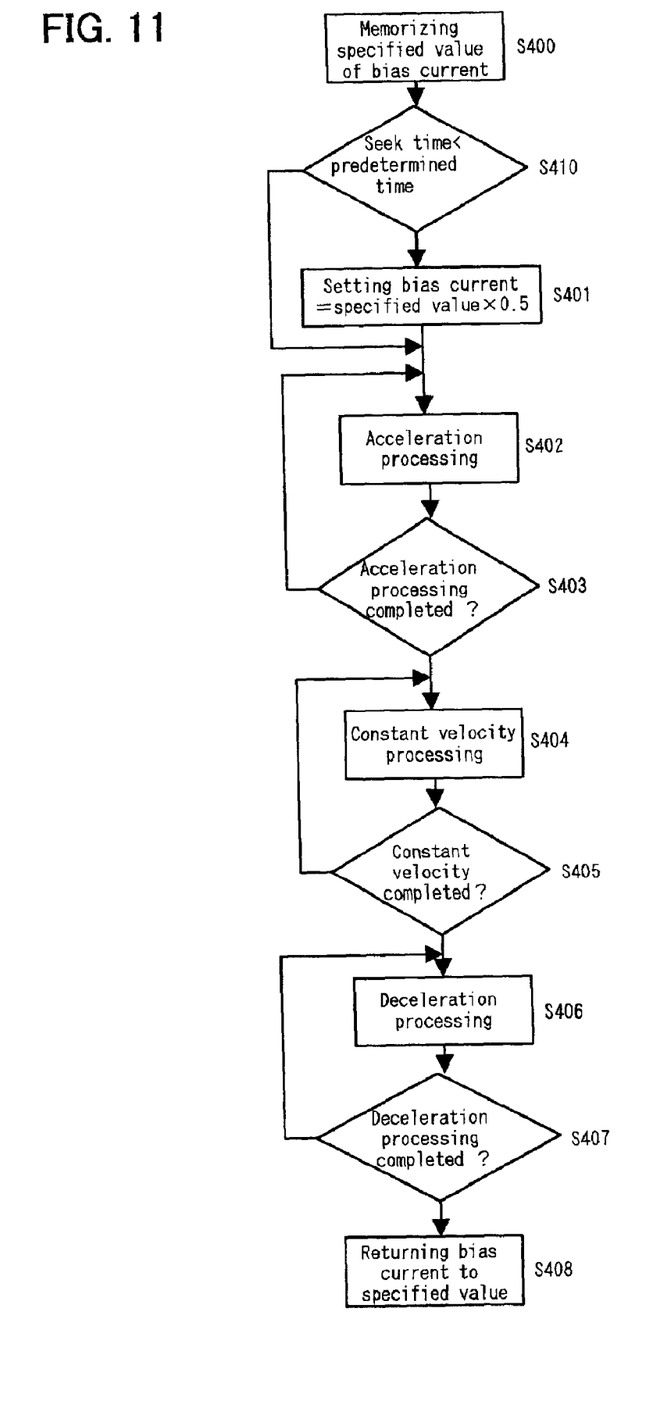
FIG. 11 is a flowchart of bias current control in the fourth aspect of the embodiment.

FIG. 11 is a flowchart of bias current control in the fourth aspect of the embodiment, and a case in which the processing of the fourth aspect of the embodiment is appended to the above-mentioned first aspect of the embodiment will be explained as an example. When the DSP 16 bias current controller 168 receives a seek command, it stores the specified value of the bias current command signal in backup memory (S400). After that, a determination is made as to whether or not seek time is shorter than a predetermined time (S410). More specifically, as seek time, for example, a determination is made as to whether or not the number of tracks from a current position determined by seek control to a target position is less than a predetermined number. Naturally, seek time can also be determined by the number of tracks and the time required to move one track. Further, a determination can also be made from the number of tracks and the track pitch based on the seek distance. When seek time is shorter than a predetermined time, the specified value of the bias current already set continues to be outputted as-is even once seek is started without performing control, which sets a new bias current value by multiplying a predetermined constant by the specified value of the bias current. When either seek time or seek distance are greater than a predetermined time, control for limiting the bias current value as described in the above respective aspects of the embodiment is performed.

Hereinabove, a case in which a bias magnetic field is applied even at reproduction was described, but, according to the type of medium, in the case of a medium for which a bias magnetic field is only applied at recording and deletion, a bias magnetic field is not applied at reproduction.

According to the present invention described hereinabove, by limiting the bias current applied to a bias coil at carriage seek, it is possible to suppress the peak value of the overall current consumption of a magneto-optical recording medium processing apparatus.

Further, because the bias current controller of the present invention can be run by a DSP inside the magneto-optical recording medium processing apparatus, it is possible to hold down power consumption without increased costs resulting from additional parts.

Further, the present invention is advantageous for limiting a power source when a power supply is received from a battery by way of an interface, such as an IDE interface or an IEEE 1394 interface.

The scope of protection of the present invention is not limited to the above aspects of the embodiment, but rather extends to the inventions disclosed in the attached claims and to the equivalents thereof.

What is claimed is:

1. A magneto-optical recording medium processing apparatus for performing at the least one of reproduction, recording and erasing on a magneto-optical recording medium, comprising:

a carriage for moving an optical head, which irradiates an optical beam onto said magneto-optical recording medium, in the target position of said magneto-optical recording medium;

a drive current controller for supplying drive current to said carriage;

a bias magnetic field generator for applying a bias magnetic field to said magneto-optical recording medium; and a bias current controller for supplying a bias current to said bias magnetic field generator, wherein said bias current controller controls a bias current value in accordance with a drive current supply.

2. The magneto-optical recording medium processing apparatus according to claim 1, wherein said bias current controller controls to limit a bias current value in relation to a specified value while drive current is being supplied.

3. The magneto-optical recording medium processing apparatus according to claim 2, wherein said bias current controller sets said bias current value to a predetermined value, which is smaller than said specified value.

4. The magneto-optical recording medium processing apparatus according to claim 2, wherein said bias current controller sets said bias current value such that the sum total of a drive current value and a bias current value do not exceed an allowable current value.

5. The magneto-optical recording medium processing apparatus according to claim 2, wherein said bias current controller sets different bias current values for at the least two time periods of the time period during which drive current is being supplied for constant velocity movement of said carriage, the time period during which drive current is being supplied for deceleration movement of said carriage, and the time period during which drive current is being supplied for the acceleration movement of said carriage.

6. The magneto-optical recording medium processing apparatus according to claim 5, wherein said bias current controller sets said bias current value to a predetermined value, which is smaller than said specified value, for at the least one time period of said time periods.

7. The magneto-optical recording medium processing apparatus according to claim 5, wherein said bias current controller sets said bias current value, such that the total of a drive current value and a bias current value do not exceed an allowable current value, for at the least one time period of said time periods.

8. The magneto-optical recording medium processing apparatus according to claim 2, wherein said bias current controller supplies a bias current of said specified value, regardless of the supply of drive current, when either the movement time or movement distance of said carriage is shorter than a predetermined value.

9. The magneto-optical recording medium processing apparatus according to claim 2, wherein said specified value is a bias current value required subsequent to the movement of said carriage, which is moved by a drive current supply.

* * * * *